(12) United States Patent
Kong et al.

(10) Patent No.: US 11,907,716 B1
(45) Date of Patent: Feb. 20, 2024

(54) VECTOR READING AND WRITING METHOD, VECTOR REGISTER SYSTEM, DEVICE, AND MEDIUM

(71) Applicant: INSPUR SUZHOU INTELLIGENT TECHNOLOGY CO., LTD., Jiangsu (CN)

(72) Inventors: Lingjun Kong, Jiangsu (CN); Zhaochun Pang, Jiangsu (CN); Qi Song, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/278,807

(22) PCT Filed: Apr. 28, 2022

(86) PCT No.: PCT/CN2022/089897
§ 371 (c)(1),
(2) Date: Aug. 24, 2023

(87) PCT Pub. No.: WO2023/056743
PCT Pub. Date: Apr. 13, 2023

(30) Foreign Application Priority Data

Oct. 9, 2021 (CN) .......................... 202111173562.2

(51) Int. Cl.
*G06F 9/30* (2018.01)
(52) U.S. Cl.
CPC ........ *G06F 9/30036* (2013.01); *G06F 9/3013* (2013.01)
(58) Field of Classification Search
CPC .................. G06F 9/30036; G06F 9/3013
See application file for complete search history.

(56) References Cited

U.S. PATENT DOCUMENTS

2013/0339667 A1* 12/2013 Alexander .............. G06F 9/384
712/208
2014/0047214 A1 2/2014 Fleischer et al.
(Continued)

FOREIGN PATENT DOCUMENTS

CN 101614788 A 12/2009
CN 103810111 A 5/2014
(Continued)

OTHER PUBLICATIONS

Haiyan Chen, et al. "GSVM a vector memory to support Gather/Scatter." Journal of National University of Defense Technology/Guofang Keji Daxue Xuebao 42.3 (2020).

*Primary Examiner* — Michael J Metzger
(74) *Attorney, Agent, or Firm* — IPro, PLLC

(57) ABSTRACT

The present disclosure discloses a method for vector reading-writing, a vector-register system, a device and a medium. When a vector-writing instruction is obtained, by using a vector-register controller, a to-be-written-vector address space is converted into a to-be-written-vector-register-file bit address, and, for a nonstandard vector, by using a nonstandard-vector converting unit, after the nonstandard vector is converted into a to-be-written nonstandard vector, and, subsequently, writing is performed, to realize the saving of vector data of any format. When a vector-reading instruction is obtained, by using the vector-register controller, according to the to-be-read width and the to-be-read length, after the to-be-read-vector address space is converted into a to-be-read-vector-register-file bit address, and, subsequently, reading is performed, to realize the reading of vector data of any format.

20 Claims, 6 Drawing Sheets

(56) References Cited

U.S. PATENT DOCUMENTS

| | | | |
|---|---|---|---|
| 2019/0042544 A1* | 2/2019 | Kashyap | G06F 17/16 |
| 2021/0081198 A1* | 3/2021 | Corbal | G06F 9/3001 |
| 2021/0216318 A1 | 7/2021 | Langhammer et al. | |

FOREIGN PATENT DOCUMENTS

| | | | |
|---|---|---|---|
| CN | 108733415 A | 11/2018 |
| CN | 112567350 A | 3/2021 |
| CN | 113485672 A | 10/2021 |
| CN | 113608786 A | 11/2021 |
| WO | 2020190501 A1 | 9/2020 |

* cited by examiner

```
        ┌─────────────────────────────────────────────────────────┐
        │   by a vector-register controller, obtaining a vector-operation instruction   │ ─── S21
        │ sent by a processor, wherein the vector-operation instruction includes a │
        │ vector-writing instruction and/or a vector-reading instruction │
        └─────────────────────────────────────────────────────────┘
                                     │
                                     ▼
        ┌─────────────────────────────────────────────────────────┐
        │   when the vector-operation instruction is the vector-reading instruction, │
        │ according to a to-be-read width and a to-be-read length that correspond to the │
        │ vector-reading instruction, by the vector-register controller, converting a to- │ ─── S22
        │ be-read-vector address space in the vector-reading instruction into a to-be- │
        │   read-vector-register-file bit address, wherein the to-be-read width is a │
        │ standard width or a nonstandard width, and the to-be-read length is a standard │
        │                    length or a nonstandard length │
        └─────────────────────────────────────────────────────────┘
                                     │
                                     ▼
        ┌─────────────────────────────────────────────────────────┐
        │   by the vector-register file, obtaining the to-be-read-vector-register-file │ ─── S23
        │ bit address, and outputting a to-be-read vector corresponding to the to-be- │
        │ read-vector-register-file bit address │
        └─────────────────────────────────────────────────────────┘
                                     │
                                     ▼
        ┌─────────────────────────────────────────────────────────┐
        │     by the nonstandard-vector converting unit, obtaining the to-be-read │
        │ vector, and when a received second converting instruction sent by the vector- │
        │ register controller indicates that the to-be-read vector is a nonstandard vector, │
        │     converting the to-be-read vector into a standard vector of second preset │ ─── S24
        │ length and width, and sending a to-be-read standard vector that is obtained by │
        │ the conversion to the vector processing unit, wherein the second preset length │
        │ and width refer to a length and a width of a predetermined inputted vector of │
        │   the vector processing unit, and the standard vector refers to a vector whose │
        │                      length is a power of 2 │
        └─────────────────────────────────────────────────────────┘
```

VECTOR READING AND WRITING METHOD, VECTOR REGISTER SYSTEM, DEVICE, AND MEDIUM

The present disclosure claims the priority of the Chinese patent application filed on Oct. 9, 2021 before the Chinese Patent Office with the application number of 202111173562.2 and the title of "VECTOR READING AND WRITING METHOD, VECTOR REGISTER SYSTEM, DEVICE, AND MEDIUM", which is incorporated herein in its entirety by reference.

TECHNICAL FIELD

The present disclosure relates to the technical field of data processing and, more particularly, to a method for vector reading-writing, a vector-register system, a device and a medium.

BACKGROUND

In processors, in order to process vectors, a vector instruction, a vector register and a vector processing unit are needed to jointly form a vector processing system. A vector refers to a group of data that are formed by a plurality of scalar quantities. For example, [1, 1, 2, 3, 4, 5] is a vector with the length of 6, wherein each of the numbers therein is referred to as one element of the vector, and the size of the space occupied by the element (the required bit quantity) is the width of the element, and is also the width of the vector. For example, regarding the vector in the above example, its largest number is 5. Because, in a digital system, 3 bits may be used to represent the numbers 0 to 7, the width of the above vector may be set to be 3 bits; in other words, the above vector has the length of 6 elements, and the width of 3 bits.

In the prior art, since vector registers may merely input and output data of fixed widths and fixed standard lengths, and may merely process standard vectors, in other words, the vector registers may merely process vectors whose length satisfies a power of 2, for example, 2, 4, 8, 16, 32 and 64; for example, the vector registers may merely output a vector of 16 bits*32. The vector registers cannot process nonstandard vectors, for example, a vector of 5 bits*10. Furthermore, the size of the register bits of a vector register is fixed, and therefore there are cases in which all of the register bits cannot be effectively utilized. Assuming that a standard vector register of 32 bits*32 is used to store a vector of 5 bits*32, then in each of the register bits, 32 bits-5 bits=27 bits cannot be utilized, and there are many null bits between two neighboring register bits (elements) in one vector, whereby the vector register has a low flexibility, and resource waste happens.

SUMMARY

In view of the above, an object of the present disclosure is to provide a method for vector reading-writing, a vector-register system, a device and a medium, which may cause that the vector-register file may output a nonstandard vector, and there is not a null bit between any two neighboring elements of one vector in the vector-register file, thereby the continuous storage of the vector elements is realized, the problem that the register bits cannot be effectively utilized is prevented, the flexibility of the vector-register file is improved, the resource is saved, and more vector operations may be supported. The specific solutions are as follows:

In the first aspect, the present disclosure discloses a method for vector reading-writing, wherein the method is applied to a predetermined vector-register system, and includes:

by a vector-register controller, obtaining a vector-operation instruction sent by a processor, wherein the vector-operation instruction includes a vector-writing instruction and/or a vector-reading instruction;

when the vector-operation instruction is the vector-writing instruction, by the vector-register controller, converting a to-be-written-vector address space in the vector-writing instruction into a to-be-written-vector-register-file bit address;

by a nonstandard-vector converting unit, obtaining a to-be-written standard vector of first preset length and width sent by a vector processing unit, and when a received first converting instruction sent by the vector-register controller indicates that a valid vector in the to-be-written vector is a nonstandard vector, converting the to-be-written standard vector into a to-be-written nonstandard vector; and by a vector-register file, obtaining the to-be-written-vector-register-file bit address, and storing the to-be-written nonstandard vector into the to-be-written-vector-register-file bit address; and when the vector-operation instruction is the vector-reading instruction, according to a to-be-read width and a to-be-read length that correspond to the vector-reading instruction, by the vector-register controller, converting a to-be-read-vector address space in the vector-reading instruction into a to-be-read-vector-register-file bit address, wherein the to-be-read width is a standard width or a nonstandard width, and the to-be-read length is a standard length or a nonstandard length; and by the vector-register file, obtaining the to-be-read-vector-register-file bit address, and outputting a to-be-read vector corresponding to the to-be-read-vector-register-file bit address.

Optionally, according to the to-be-read width and the to-be-read length that correspond to the vector-reading instruction, by the vector-register controller, converting the to-be-read-vector address space in the vector-reading instruction into the to-be-read-vector-register-file bit address includes:

determining whether a vector-length-width register sends the to-be-read length and the to-be-read width that correspond to the vector-reading instruction to the vector-register controller; and when the vector-length-width register sends the to-be-read length and the to-be-read width that correspond to the vector-reading instruction to the vector-register controller, according to the to-be-read-vector address space in the vector-reading instruction, the to-be-read length and the to-be-read width, determining the to-be-read-vector-register-file bit address.

Optionally, according to the to-be-read-vector address space in the vector-reading instruction, the to-be-read length and the to-be-read width, determining the to-be-read-vector-register-file bit address includes:

regarding a product of the to-be-read length and the to-be-read width as a data-bit-address length of the to-be-read vector in the vector-register file; and from a first register in the vector-register controller, determining a to-be-read head address of the to-be-read-vector address space in the vector-register file, and inputting the data-bit-address length and the to-be-read head address into a reading-data address line of the vector-register file, so that the vector-register file obtains the to-be-read-vector-register-file bit address.

Optionally, by the vector-register file, obtaining the to-be-read-vector-register-file bit address includes:

by the reading-data address line of the vector-register file, obtaining the data-bit-address length, wherein a width of the reading-data address line is a data bit number that the vector-register file is capable of storing, to operate the vector-register file with a precision of a bit; and by the reading-data address line of the vector-register file, obtaining the to-be-read head address, and shifting the data-bit-address length by a length of the to-be-read head address, to obtain the to-be-read-vector-register-file bit address, wherein the reading-data address line is controlled by a shift controller.

Optionally, after determining whether the vector-length-width register sends the to-be-read length and the to-be-read width that correspond to the vector-reading instruction to the vector-register controller, the method further includes:

when the vector-length-width register does not send the to-be-read length and the to-be-read width that correspond to the vector-reading instruction to the vector-register controller, from a first register in the vector-register controller, determining a to-be-read head address of the to-be-read-vector address space in the vector-register file;

determining a vector length in a second register in the vector-register controller that corresponds to the to-be-read-vector address space as the to-be-read length, and determining a vector width in a third register in the vector-register controller that corresponds to the to-be-read-vector address space as the to-be-read width;

regarding a product of the to-be-read length and the to-be-read width as a data-bit-address length of the to-be-read vector in the vector-register file; and inputting the data-bit-address length and the to-be-read head address into a reading-data address line of the vector-register file, whereby the vector-register file obtains the to-be-read-vector-register-file bit address.

Optionally, after outputting the to-be-read vector corresponding to the to-be-read-vector-register-file bit address, the method further includes:

by the nonstandard-vector converting unit, obtaining the to-be-read vector, and when a received second converting instruction sent by the vector-register controller indicates that the to-be-read vector is a nonstandard vector, converting the to-be-read vector into a standard vector of second preset length and width, and sending a to-be-read standard vector that is obtained by the conversion to the vector processing unit, wherein the second preset length and width refer to a length and a width of a predetermined inputted vector of the vector processing unit, and the standard vector refers to a vector whose length is a power of 2.

Optionally, when the received second converting instruction sent by the vector-register controller indicates that the to-be-read vector is the nonstandard vector, converting the to-be-read vector into the standard vector of second preset length and width includes:

receiving the second converting instruction sent by the vector-register controller, wherein the second converting instruction contains a first actual length and a first actual width of the to-be-read vector; and when the first actual length is not a power of 2, which indicates that the to-be-read vector is a nonstandard vector, reading the second preset length and width from the nonstandard-vector converting unit, supplementing a vector length of the to-be-read vector from the first actual length to a preset length of the second preset length and width, and supplementing a vector width of each of elements of the to-be-read vector from the first actual width to a preset width of the second preset length and width, to convert the to-be-read vector into a standard vector of the second preset length and width.

Optionally, vector elements in the vector-register file are continuously stored, and there is not a null bit between any two neighboring vector elements in a vector in the vector-register file.

In the second aspect, the present disclosure discloses a vector-register system, wherein the vector-register system includes:

a vector-register controller configured for obtaining a vector-operation instruction sent by a processor, wherein the vector-operation instruction includes a vector-writing instruction and/or a vector-reading instruction;

wherein the vector-register controller is further configured for, when the vector-operation instruction is the vector-writing instruction, converting a to-be-written-vector address space in the vector-writing instruction into a to-be-written-vector-register-file bit address;

a nonstandard-vector converting unit configured for obtaining a to-be-written standard vector of first preset length and width sent by a vector processing unit, and when a received first converting instruction sent by the vector-register controller indicates that a valid vector in the to-be-written vector is a nonstandard vector, converting the to-be-written standard vector into a to-be-written nonstandard vector; and a vector-register file configured for obtaining the to-be-written-vector-register-file bit address, and storing the to-be-written nonstandard vector into the to-be-written-vector-register-file bit address;

wherein the vector-register controller is further configured for, when the vector-operation instruction is the vector-reading instruction, according to a to-be-read width and a to-be-read length that correspond to the vector-reading instruction, converting a to-be-read-vector address space in the vector-reading instruction into a to-be-read-vector-register-file bit address, wherein the to-be-read width is a standard width or a nonstandard width, and the to-be-read length is a standard length or a nonstandard length; and wherein the vector-register file is further configured for, by the vector-register file, obtaining the to-be-read-vector-register-file bit address, and outputting a to-be-read vector corresponding to the to-be-read-vector-register-file bit address.

In the third aspect, the present disclosure discloses an electronic device, wherein the electronic device includes the vector-register system stated above.

In the fourth aspect, the present disclosure discloses a computer-readable storage medium, wherein the computer-readable storage medium is configured to save a computer program, and the computer program, when executed by a processor, implements the method for vector reading-writing stated above.

The present disclosure discloses a method for vector reading-writing, wherein the method is applied to a predetermined vector-register system, and includes: by a vector-register controller, obtaining a vector-operation instruction sent by a processor, wherein the vector-operation instruction includes a vector-writing instruction and/or a vector-reading instruction; when the vector-operation instruction is the vector-writing instruction, by the vector-register controller, converting a to-be-written-vector address space in the vector-writing instruction into a to-be-written-vector-registerfile bit address; by a nonstandard-vector converting unit, obtaining a to-be-written standard vector of first preset length and width sent by a vector processing unit, and when a received first converting instruction sent by the vector-register controller indicates that a valid vector in the to-be-written vector is a nonstandard vector, converting the to-be-written standard vector into a to-be-written nonstandard vector; and by a vector-register file, obtaining the to-be-written-vector-register-file bit address, and storing the to-be-written nonstandard vector into the to-be-written-vector-register-file bit address; and when the vector-operation instruction is the vector-reading instruction, according to a to-be-read width and a to-be-read length that correspond to the vector-reading instruction, by the vector-register controller, converting a to-be-read-vector address space in the vector-reading instruction into a to-be-read-vector-register-file bit address, wherein the to-be-read width is a standard width or a nonstandard width, and the to-be-read length is a standard length or a nonstandard length; and by the vector-register file, obtaining the to-be-read-vector-register-file bit address, and outputting a to-be-read vector corresponding to the to-be-read-vector-register-file bit address.

It may be seen that, when the obtained vector-operation instruction is a vector-writing instruction, by the vector-register controller, the to-be-written-vector address space in the vector-writing instruction is converted into a to-be-written-vector-register-file bit address, and, for a nonstandard vector, by using the nonstandard-vector converting unit, the to-be-written standard vector is converted into a to-be-written nonstandard vector. Subsequently, the to-be-written nonstandard vector is stored into the to-be-written-vector-register-file bit address.

Accordingly, the saving of vector data of any format may be realized, i.e., writing in nonstandard-vector data of any width and any length. When the obtained vector-operation instruction is a vector-reading instruction, by using the vector-register controller, according to the to-be-read width and the to-be-read length, the to-be-read-vector address space in the vector-reading instruction is converted into a to-be-read-vector-register-file bit address, wherein the to-be-read width is a standard width or a nonstandard width, and the to-be-read length is a standard length or a nonstandard length. In other words, the to-be-read-vector-register-file bit address may be obtained by the conversion according to the nonstandard width and the nonstandard length and with reference to the to-be-read-vector address space. Accordingly, vector data of any format may be read, i.e., reading nonstandard-vector data of any width and any length. Accordingly, it may be seen that, in the present disclosure, by using the vector-register controller, the vector-register file and the nonstandard-vector converting unit in the vector-register system, operations of vector reading and vector writing may be performed simultaneously, vector data of any format may be outputted, and simultaneously vector data of any format may be saved, whereby the vector pre-calculation of more nonstandard vectors may be supported.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are merely embodiments of the present disclosure, and a person skilled in the art may obtain other figures according to the provided figures without paying creative work.

FIG. 4 is a specific flow chart of a method for vector reading-writing according to the present disclosure;

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
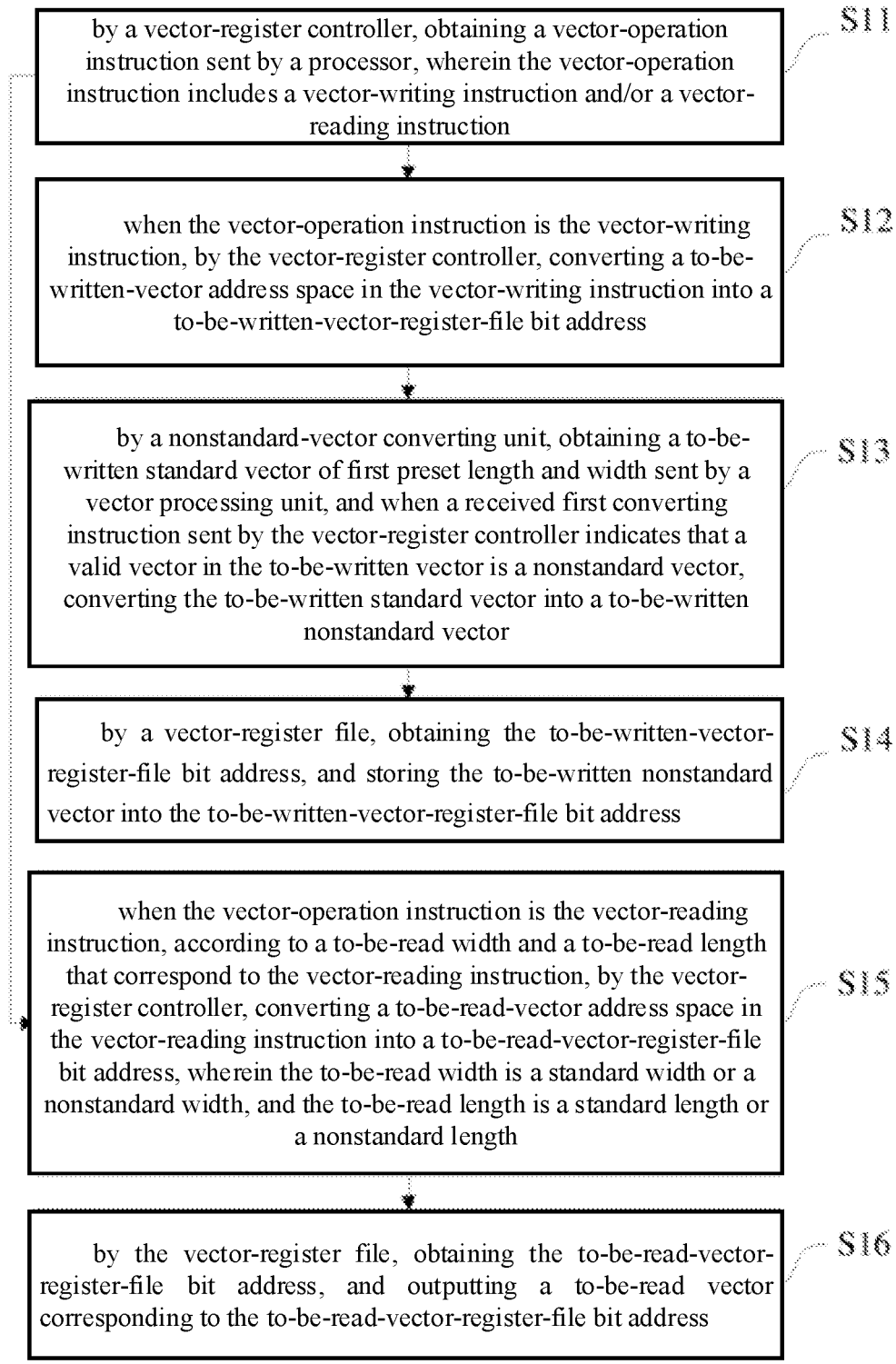
FIG. 1 is a flow chart of a method for vector reading-writing according to the present disclosure.

Referring to FIG. 1, an embodiment of the present disclosure discloses a method for vector reading-writing, wherein the method is applied to a predetermined vector-register system. The method includes:

Step S11: by a vector-register controller, obtaining a vector-operation instruction sent by a processor, wherein the vector-operation instruction includes a vector-writing instruction and/or a vector-reading instruction.

Figure 2:
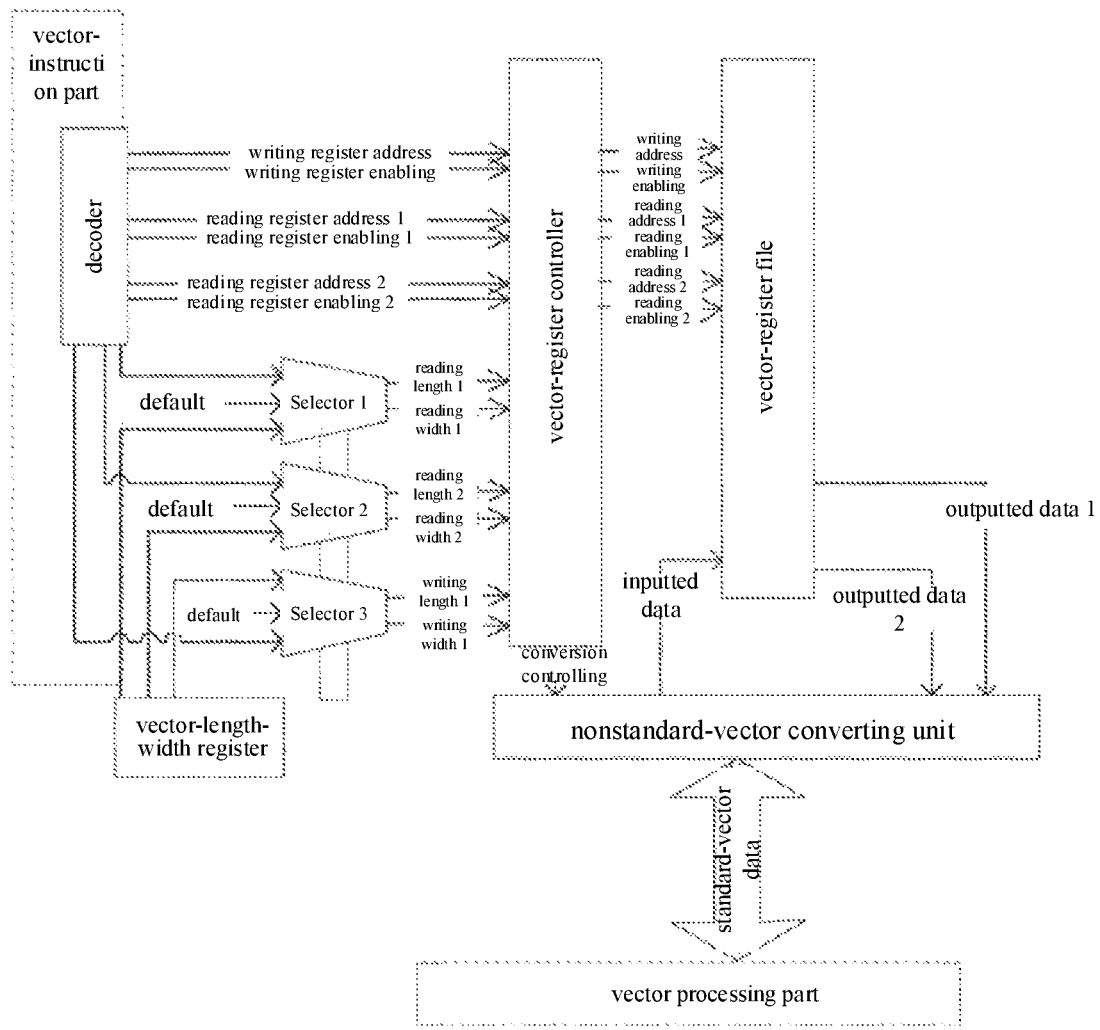
FIG. 2 is a schematic structural diagram of a vector-register system according to the present disclosure.

Referring to FIG. 2, regarding the three major components in vector processing, the vector register, the vector processing unit and the vector instruction, the vector register is adjusted, and the vector register is constructed into the vector-register system, wherein the vector-register system includes a vector-register controller, a vector-register file and a nonstandard-vector converting unit, and the decoder part in the figure belongs to the CPU part.

Firstly, when it is required to perform the writing and/or reading of a vector, a processor may send a corresponding vector-writing instruction and/or vector-reading instruction. Therefore, it is required to obtain the vector-writing instruction and/or vector-reading instruction sent by the processor by using the vector-register controller, so that, according to the vector-writing instruction and/or vector-reading instruction, the subsequent writing and/or reading operation is performed. Furthermore, as shown in FIG. 2, a selector 1 and a selector 2 are used to control the reading of the vector-register controller, and a selector 3 is used to control the writing of the vector-register controller, which prevents the case in which merely one selector controls the reading or the writing, whereby the vector-writing instruction and the vector-reading instruction may be processed simultaneously within one period.

In the present embodiment, the vector elements in the vector-register file are continuously stored, and there is not a null bit any two neighboring vector elements in a vector in the vector-register file. In other words, in the vector-register file the continuous storage of the vector elements is realized, thereby the problems caused when the register bits cannot be effectively utilized are prevented, which may save the quantity of the register units in the vector-register file, improve the flexibility of the vector-register file, and save the resource.

Step S12: when the vector-operation instruction is the vector-writing instruction, by the vector-register controller, converting a to-be-written-vector address space in the vector-writing instruction into a to-be-written-vector-register-file bit address.

In the present embodiment, when the vector-operation instruction is the vector-writing instruction, by the vector-register controller, the to-be-written-vector address space in the vector-writing instruction is converted into a to-be-written-vector-register-file bit address. It may be understood that the register address refers to that, from the perspective of the processor and the compiler, in the vector-register file, there are merely a plurality of vector registers, for example, 32 vector registers, which are V0 to V31, and are referred to as the vector address space. Therefore, when the processor dispatches the vector-writing instruction, that it is required to specify the to-be-written-vector address space, i.e., specifying which vector register Vx is to be written into is performed. Because the vector-writing instruction merely specifies which vector register is to be written into, the vector-register controller, after obtaining the vector-writing instruction, it is further required to convert the to-be-written-vector address space in the vector-writing instruction into a to-be-written-vector-register-file bit address, thereby obtaining the address of the to-be-written vector in the vector-register file.

Step S13: by a nonstandard-vector converting unit, obtaining a to-be-written standard vector of first preset length and width sent by a vector processing unit, and when a received first converting instruction sent by the vector-register controller indicates that a valid vector in the to-be-written vector is a nonstandard vector, converting the to-be-written standard vector into a to-be-written nonstandard vector.

The vector processing unit may send the to-be-written standard vector of the first preset length and width that is required to be stored to the nonstandard-vector converting unit, and the vector-register controller may further send the first converting instruction to the nonstandard-vector converting unit. The first preset length and width are a length and a width of fixed standards. The first converting instruction contains a writing length and a writing width, and the writing length and the writing width are the actual effective length and width in the to-be-written standard vector. Because the vector outputted by the vector processing unit is a vector of the standard length and width that are predetermined, the to-be-written vector outputted by the vector processing unit is a standard vector of the first preset length and width. Therefore, when the first converting instruction is obtained, it is required to determine whether the valid vector in the to-be-written vector is a nonstandard vector. When the valid vector in the to-be-written vector is a nonstandard vector, then the null bits in the to-be-written vector are deleted, to obtain a to-be-written standard vector, which may save the space used for storing the to-be-written vector, so that there is not a null bit between two neighboring elements in one vector, to realize continuous storage. For example, when the valid vector obtained in the vector processing unit is 4 bits*10, but the first preset length and width of the vector outputted by the vector processing unit are 8 bits*16, then, when the vector processing unit outputs a 4 bits*10 vector, it is outputted in the form of 8 bits*16, but the significant bits therein are merely 4 bits*10.

Step S14: by a vector-register file, obtaining the to-be-written-vector-register-file bit address, and storing the to-be-written nonstandard vector into the to-be-written-vector-register-file bit address.

In the present embodiment, when a to-be-written nonstandard vector is obtained, the nonstandard-vector converting unit may send the to-be-written nonstandard vector to the vector-register file, so that the vector-register file may store the to-be-written register file into the to-be-written-vector-register-file bit address. Accordingly, the saving of vector data of any format may be realized, i.e., writing in nonstandard-vector data of any width and any length.

Step S15: when the vector-operation instruction is the vector-reading instruction, according to a to-be-read width and a to-be-read length that correspond to the vector-reading instruction, by the vector-register controller, converting a to-be-read-vector address space in the vector-reading instruction into a to-be-read-vector-register-file bit address, wherein the to-be-read width is a standard width or a nonstandard width, and the to-be-read length is a standard length or a nonstandard length.

In the present embodiment, when the vector-operation instruction is a vector-reading instruction, according to the to-be-read width and the to-be-read length that correspond to the vector-reading instruction, by the vector-register controller, the to-be-read-vector address space in the vector-reading instruction is converted into a to-be-read-vector-register-file bit address, wherein the to-be-read width is a standard width or a nonstandard width, and the to-be-read length is a standard length or a nonstandard length. It may be understood that, because the vector-reading instruction merely specifies which vector register is to be read, the vector-register controller, after obtaining the vector-reading instruction, it is further required to convert the to-be-read-vector address space in the vector-reading instruction into a to-be-read-vector-register-file bit address, thereby obtaining the address of the to-be-read vector in the vector-register file. In other words, the to-be-read-vector-register-file bit address is determined according to the to-be-read-vector address space, the to-be-read length and the to-be-read width, and because the to-be-read width may be a nonstandard width, and the to-be-read length may be a nonstandard length, the to-be-read-vector-register-file bit address that is obtained by the conversion is also a vector-register-file bit address that corresponds to a nonstandard vector. Accordingly, the reading of vector data of any format may be realized, i.e., reading nonstandard-vector data of any width and any length.

In the present embodiment, according to the to-be-read width and the to-be-read length that correspond to the vector-reading instruction, by the vector-register controller, converting the to-be-read-vector address space in the vector-reading instruction into the to-be-read-vector-register-file bit address may include: determining whether a vector-length-width register sends the to-be-read length and the to-be-read width that correspond to the vector-reading instruction to the vector-register controller; and when the vector-length-width register sends the to-be-read length and the to-be-read width that correspond to the vector-reading instruction to the vector-register controller, according to the to-be-read-vector address space in the vector-reading instruction, the to-be-read length and the to-be-read width, determining the to-be-read-vector-register-file bit address. In other words, the vector-length-width register may send the to-be-read length and the to-be-read width to the vector-register file. Therefore, when the vector-register controller receives the vector-reading instruction, it is required to firstly determine whether the vector-length-width register sends the to-be-read length and the to-be-read width to the vector-register controller. When the vector-length-width register sends the to-be-read length and the to-be-read width to the vector-register controller, then the to-be-read-vector-register-file bit address may be determined according to the to-be-read-vector address space in the vector-reading instruction, the to-be-read length and the to-be-read width.

In the present embodiment, according to the to-be-read-vector address space in the vector-reading instruction, the to-be-read length and the to-be-read width, determining the to-be-read-vector-register-file bit address may include: regarding a product of the to-be-read length and the to-be-read width as a data-bit-address length of the to-be-read vector in the vector-register file; and from a first register in the vector-register controller, determining a to-be-read head address of the to-be-read-vector address space in the vector-register file, and inputting the data-bit-address length and the to-be-read head address into a reading-data address line of the vector-register file, so that the vector-register file obtains the to-be-read-vector-register-file bit address.

In other words, by regarding the product of the to-be-read length and the to-be-read width as the data-bit-address length in the vector-register file, the data bit number to be read from the vector-register file is thus determined. The vector-register controller includes a first controller, and the first controller is configured for storing the head address in the vector register of each of the vectors. Therefore, the to-be-read head address of the to-be-read-vector address space in the vector-register file may be determined from the first register in the vector-register controller, and the data-bit-address length and the to-be-read head address may be inputted into a reading-data address line of the vector-register file, so that the vector-register file obtains the to-be-read-vector-register-file bit address.

When the vector-length-width register does not send the to-be-read length and the to-be-read width to the vector-register controller, from the first register in the vector-register controller, the to-be-read head address of the to-be-read-vector address space in the vector-register file is determined, the vector length in the second register in the vector-register controller that corresponds to the to-be-read-vector address space is determined as the to-be-read length, and the vector width in the third register in the vector-register controller that corresponds to the to-be-read-vector address space is determined as the to-be-read width; the product of the to-be-read length and the to-be-read width is regarded as the data-bit-address length of the to-be-read vector in the vector-register file; and inputting the data-bit-address length and the to-be-read head address into a reading-data address line of the vector-register file, so that the vector-register file obtains the to-be-read-vector-register-file bit address.

In other words, the vector-register controller further includes a second register and a third register, the second register records the length of each of the vectors in the vector-register file, and the third register records the width of each of the vectors in the vector-register file. Therefore, when the vector-length register does not send the to-be-read length and the to-be-read width that correspond to the vector-reading instruction to the vector-register controller, from the first register, the to-be-read head address of the to-be-read-vector address space in the vector-register file is determined; subsequently the vector length in the second register that corresponds to the to-be-read-vector address space is determined as the to-be-read length, and the vector width in the third register that corresponds to the to-be-read-vector address space as the to-be-read width; subsequently the product of the to-be-read length and the to-be-read width is regarded as the data-bit-address length of the to-be-read vector in the vector-register file; and the data-bit-address length and the to-be-read head address are input into a reading-data address line of the vector-register file, so that the vector-register file obtains the to-be-read-vector-register-file bit address.

Step S16: by the vector-register file, obtaining the to-be-read-vector-register-file bit address, and outputting a to-be-read vector corresponding to the to-be-read-vector-register-file bit address.

It may be understood that the vector-register controller, after converting the to-be-read-vector address space in the vector-reading instruction into the to-be-read-vector-register-file bit address, may send the to-be-read-vector-register-file bit address to the vector-register file, wherein the vector-register file is configured for registering vectors. Correspondingly, the vector-register file is required to obtain the to-be-read-vector-register-file bit address, and subsequently the to-be-read vector corresponding to the to-be-read-vector-register-file bit address may be outputted. Accordingly, vector data of any format may be read, i.e., reading nonstandard-vector data of any width and any length.

Moreover, the complexity of the vector instruction may be simplified. That is because the vector-register controller in the system may store the formats of the corresponding vectors, in most cases the vector instruction does not require being configured with the vector length, the configuring process of the vector element width and the vector length may be omitted, and merely the address of the required vector is cared, which hugely simplifies the operation of the compiler and the operation of the processor.

Figure 3:
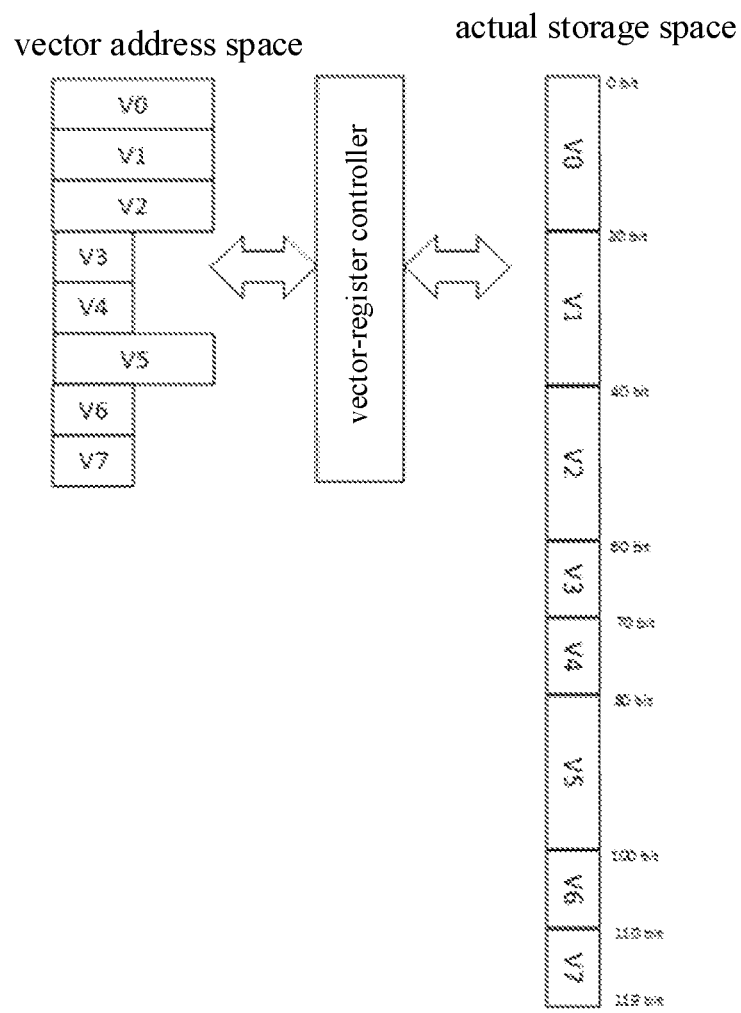
FIG. 3 is a schematic diagram of the existing vector address space and the actual storage space of the vector-register file.

Furthermore, in the present embodiment, the vector elements in the vector-register file are continuously stored, and there is not a null bit between any two neighboring vector elements in a vector in the vector-register file. Referring to FIG. 3, FIG. 3 is a schematic diagram of the existing vector address space and the actual storage space of the vector-register file. In the prior art, each of the vector address spaces has the fixed size, and each of the vector address spaces stores one vector, for example, storing V1 to V7. When the vector that is stored into the current vector address space does not occupy the whole space of the vector address space, no other datum is subsequently stored in the unoccupied space, and the next vector is stored directly into the next vector address space. However, the vector-register file according to the present disclosure is not delimited into a particular size in advance, and therefore each of the vectors may be stored according to the actual length and width of the vector. Generally, after the current vector has been completely stored, the next vector may be stored.

In other words, and there is not a null bit between any two neighboring vector elements in a vector in the vector-register file. Generally, there is not a null bit between any two neighboring vectors stored in the vector-register file either, but, in some cases, after one vector is completely stored, several vector element bits may be reserved after that vector, and subsequently the next vector is stored.

After inputting the data-bit-address length and the to-be-read head address into the reading-data address line of the vector-register file, so that the vector-register file obtains the to-be-read-vector-register-file bit address, by the vector-register file, obtaining the to-be-read-vector-register-file bit address includes: by the reading-data address line of the vector-register file, obtaining the data-bit-address length, wherein a width of the reading-data address line is a data bit number that the vector-register file is capable of storing, to operate the vector-register file with a precision of a bit; and by the reading-data address line of the vector-register file, obtaining the to-be-read head address, and shifting the data-bit-address length by a length of the to-be-read head address, to obtain the to-be-read-vector-register-file bit address, wherein the reading-data address line is controlled by a shift controller.

In other words, the vector-register file is a true dual-port RAM, and, certainly, may also, as shown in FIG. 2, include 3 ports, one writing port and two reading ports. The vector-register file includes different ports, and is a random access memory that may simultaneously complete the two operations of reading and writing. Furthermore, both of the widths of the writing-data address line in the reading ports and the writing-data address line in the writing port are the data bit number that the vector-register file is capable of storing, to operate the vector-register file with a precision of a bit. Furthermore, the reading-data address line and the writing-data address line are controlled by the shift controller, and the width of the data line of the read-write enabling is 1. By inputting the data-bit-address length into the reading-data address line of the vector-register file, the reading-data address line of the vector-register file obtains the data-bit-address length, and, subsequently, by inputting the to-be-read head address into the reading-data address line, the reading-data address line obtains the to-be-read head address. The data-bit-address length is shifted by the length of the to-be-read head address, to obtain the to-be-read-vector-register-file bit address. For example, when the data-bit-address length is 10 bits, after the data-bit-address length has been inputted into the reading-data address line, the 10 bits low electric level of the reading-data address line may be raised. Subsequently, when the to-be-read head address is 20 bits, then the 10 bits low electric level of the reading-data address line is shifted by 20 bits, i.e., raising the electric level of the reading-data address line from 20 bits to 29 bits, and then the to-be-read-vector-register-file bit address may be obtained and read.

Accordingly, it may be seen that, in the present embodiment, when the obtained vector-operation instruction is a vector-writing instruction, by the vector-register controller, the to-be-written-vector address space in the vector-writing instruction is converted into a to-be-written-vector-register-file bit address, and, for a nonstandard vector, by using the nonstandard-vector converting unit, the to-be-written standard vector is converted into a to-be-written nonstandard vector. Subsequently, the to-be-written nonstandard vector is stored into the to-be-written-vector-register-file bit address. Accordingly, the saving of vector data of any format may be realized, i.e., writing in nonstandard-vector data of any width and any length. When the obtained vector-operation instruction is a vector-reading instruction, by using the vector-register controller, according to the to-be-read width and the to-be-read length, the to-be-read-vector address space in the vector-reading instruction is converted into a to-be-read-vector-register-file bit address, wherein the to-be-read width is a standard width or a nonstandard width, and the to-be-read length is a standard length or a nonstandard length. In other words, the to-be-read-vector-register-file bit address may be obtained by the conversion according to the nonstandard width and the nonstandard length and with reference to the to-be-read-vector address space. Accordingly, vector data of any format may be read, i.e., reading nonstandard-vector data of any width and any length. Accordingly, it may be seen that, in the present disclosure, by using the vector-register controller, the vector-register file and the nonstandard-vector converting unit in the vector-register system, operations of vector reading and vector writing may be performed simultaneously, vector data of any format may be outputted, and simultaneously vector data of any format may be saved, whereby the vector pre-calculation of more nonstandard vectors may be supported.

Referring to FIG. 4, an embodiment of the present disclosure discloses a specific method for vector reading-writing, wherein the method is applied to a predetermined vector-register system. The method includes:

Step S21: by a vector-register controller, obtaining a vector-operation instruction sent by a processor, wherein the vector-operation instruction includes a vector-writing instruction and/or a vector-reading instruction.

Step S22: when the vector-operation instruction is the vector-reading instruction, according to a to-be-read width and a to-be-read length that correspond to the vector-reading instruction, by the vector-register controller, converting a to-be-read-vector address space in the vector-reading instruction into a to-be-read-vector-register-file bit address, wherein the to-be-read width is a standard width or a nonstandard width, and the to-be-read length is a standard length or a nonstandard length.

Step S23: by the vector-register file, obtaining the to-be-read-vector-register-file bit address, and outputting a to-be-read vector corresponding to the to-be-read-vector-register-file bit address.

Step S24: by the nonstandard-vector converting unit, obtaining the to-be-read vector, and when a received second converting instruction sent by the vector-register controller indicates that the to-be-read vector is a nonstandard vector, converting the to-be-read vector into a standard vector of second preset length and width, and sending a to-be-read standard vector that is obtained by the conversion to the vector processing unit, wherein the second preset length and width refer to a length and a width of a predetermined inputted vector of the vector processing unit, and the standard vector refers to a vector whose length is a power of 2.

The vector-register file, when outputting the to-be-read vector, sends the to-be-read vector to the nonstandard-vector converting unit. Correspondingly, the nonstandard-vector converting unit is required to obtain the to-be-read vector, and the vector-register controller sends the second converting instruction to the nonstandard-vector converting unit, and, when the second converting instruction indicates that the to-be-read vector is a nonstandard vector, converts the to-be-read vector into a standard vector of the second preset length and width, and sends a to-be-read standard vector that is obtained by the conversion to the vector processing unit, wherein the second preset length and width refer to the length and the width of a predetermined inputted vector of the vector processing unit, and the standard vector refers to a vector whose length is the power of 2.

In other words, because the inputs that the vector processing unit requires are usually standard vectors of the second preset length and width, i.e., fixed standard length and width, when the second converting instruction sent by the vector-register controller is obtained, and, when the second converting instruction indicates that the to-be-read vector is a nonstandard vector, it is required to convert the to-be-read vector into a standard vector of the second preset length and width.

In the present embodiment, when the received second converting instruction sent by the vector-register controller indicates that the to-be-read vector is a nonstandard vector, converting the to-be-read vector into the standard vector of the second preset length and width may include: receiving the second converting instruction sent by the vector-register controller, wherein the second converting instruction contains a first actual length and a first actual width of the to-be-read vector; and when the first actual length is not a power of 2, which indicates that the to-be-read vector is a nonstandard vector, reading the second preset length and width from the nonstandard-vector converting unit, supplementing a vector length of the to-be-read vector from the first actual length to a preset length of the second preset length and width, and supplementing a vector width of each of elements of the to-be-read vector from the first actual width to a preset width of the second preset length and width, to convert the to-be-read vector into a standard vector of the second preset length and width.

Figure 5:
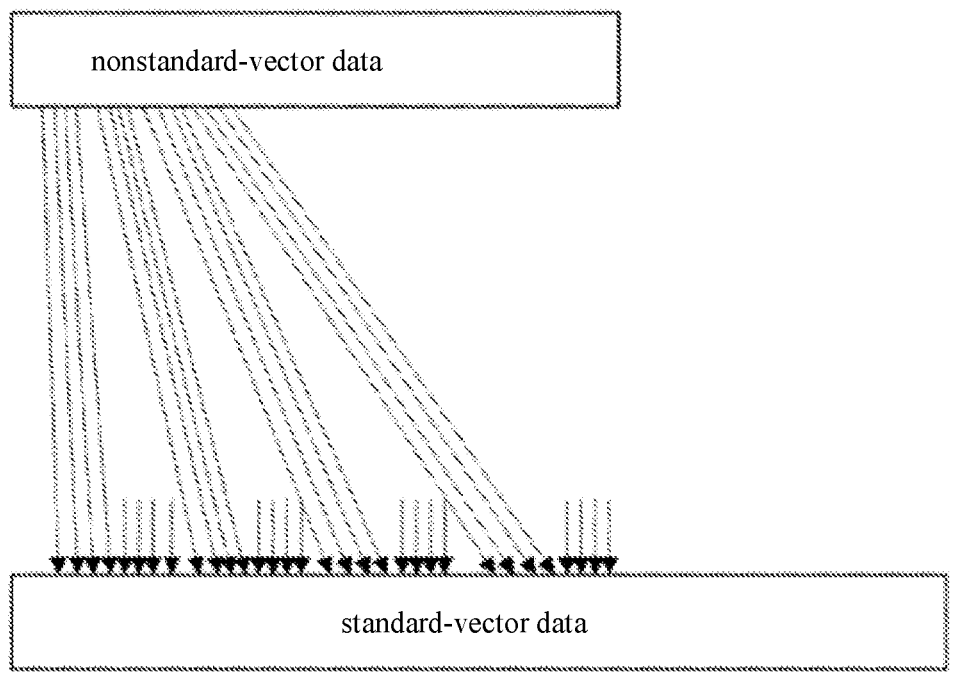
FIG. 5 is a schematic diagram of the conversion from a nonstandard vector into a standard vector according to the present disclosure.

Referring to FIG. 5, FIG. 5 is a schematic diagram of the conversion from a nonstandard vector into a standard vector. When the to-be-read vector is a nonstandard vector, each of the elements in the to-be-read vector is mapped to the corresponding element bit of a standard vector of the second preset length and width. Regarding the part whose preset length is greater than the length of the to-be-read vector, the element bit is required to undergo a supplementing operation, and regarding the part whose preset width is greater than the width of the to-be-read vector, the element bit is also required to undergo a supplementing operation. For example, when a to-be-read vector of 4 bits*3 is converted into a standard vector of the second preset length and width of 8 bits*8, then the first element of the to-be-read vector is regarded as the first element of the standard vector after the conversion, the second element of the to-be-read vector is regarded as the second element of the standard vector after the conversion, the third element of the to-be-read vector is regarded as the third element of the standard vector after the conversion, and after the conversion, the other elements in the standard vector are required to undergo a supplementing operation, wherein because each of the elements is merely 4 bits, it is required to supplement each of the elements to 8 bits.

Accordingly, it may be seen that, in the present embodiment, by the nonstandard-vector converting unit, obtaining the to-be-read vector, and when a received second converting instruction sent by the vector-register controller indicates that the to-be-read vector is a nonstandard vector, converting the to-be-read vector into a standard vector of the second preset length and width, and sending a to-be-read standard vector that is obtained by the conversion to the vector processing unit, wherein the second preset length and width refer to a length and a width of a predetermined inputted vector of the vector processing unit, and the standard vector refers to a vector whose length is a power of 2. In other words, after the vector-register file outputs a nonstandard vector, the nonstandard-vector converting unit may further convert the nonstandard vector into a standard vector of the second preset length and width that the vector processing unit supports to input, which satisfies the storage and the outputting of the nonstandard vector in the vector-register file, and does not affect the processing of the corresponding vector of the vector processing unit.

Figure 6:
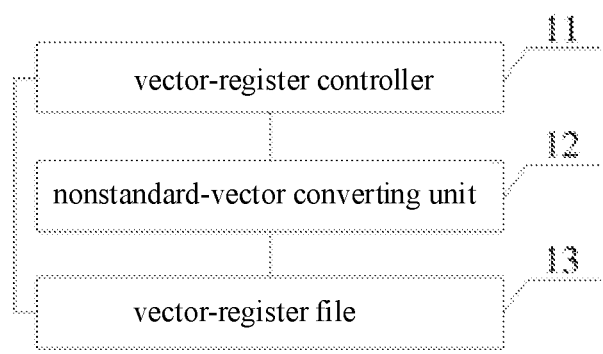
FIG. 6 is a schematic structural diagram of an electronic device according to the present disclosure.

Referring to FIG. 6, an embodiment of the present disclosure discloses a vector-register system, wherein the vector-register system includes:

a vector-register controller 11 configured for obtaining a vector-operation instruction sent by a processor, wherein the vector-operation instruction includes a vector-writing instruction and/or a vector-reading instruction;

wherein the vector-register controller 11 is further configured for, when the vector-operation instruction is the vector-writing instruction, converting a to-be-written-vector address space in the vector-writing instruction into a to-be-written-vector-register-file bit address;

a nonstandard-vector converting unit 12 configured for obtaining a to-be-written standard vector of first preset length and width sent by a vector processing unit, and when a received first converting instruction sent by the vector-register controller indicates that a valid vector in the to-be-written vector is a nonstandard vector, converting the to-be-written standard vector into a to-be-written nonstandard vector; and a vector-register file 13 configured for obtaining the to-be-written-vector-register-file bit address, and storing the to-be-written nonstandard vector into the to-be-written-vector-register-file bit address;

wherein the vector-register controller 11 is further configured for, when the vector-operation instruction is the vector-reading instruction, according to a to-be-read width and a to-be-read length that correspond to the vector-reading instruction, converting a to-be-read-vector address space in the vector-reading instruction into a to-be-read-vector-register-file bit address, wherein the to-be-read width is a standard width or a nonstandard width, and the to-be-read length is a standard length or a nonstandard length; and wherein the vector-register file 13 is further configured for, by the vector-register file, obtaining the to-be-read-vector-register-file bit address, and outputting a to-be-read vector corresponding to the to-be-read-vector-register-file bit address.

Accordingly, it may be seen that, when the obtained vector-operation instruction is a vector-writing instruction, by the vector-register controller, the to-be-written-vector address space in the vector-writing instruction is converted into a to-be-written-vector-register-file bit address, and, for a nonstandard vector, by using the nonstandard-vector converting unit, the to-be-written standard vector is converted into a to-be-written nonstandard vector. Subsequently, the to-be-written nonstandard vector is stored into the to-be-written-vector-register-file bit address. Accordingly, the saving of vector data of any format may be realized, i.e., writing in nonstandard-vector data of any width and any length. When the obtained vector-operation instruction is a vector-reading instruction, by using the vector-register controller, according to the to-be-read width and the to-be-read length, the to-be-read-vector address space in the vector-reading instruction is converted into a to-be-read-vector-register-file bit address, wherein the to-be-read width is a standard width or a nonstandard width, and the to-be-read length is a standard length or a nonstandard length. In other words, the to-be-read-vector-register-file bit address may be obtained by the conversion according to the nonstandard width and the nonstandard length and with reference to the to-be-read-vector address space. Accordingly, vector data of any format may be read, i.e., reading nonstandard-vector data of any width and any length. Accordingly, it may be seen that, in the present disclosure, by using the vector-register controller, the vector-register file and the nonstandard-vector converting unit in the vector-register system, operations of vector reading and vector writing may be performed simultaneously, vector data of any format may be outputted, and simultaneously vector data of any format may be saved, whereby the vector pre-calculation of more nonstandard vectors may be supported.

In some specific implementations, the vector-register controller 11 is configured for:

determining whether a vector-length-width register sends the to-be-read length and the to-be-read width that correspond to the vector-reading instruction to the vector-register controller; and when a vector-length-width register sends the to-be-read length and the to-be-read width that correspond to the vector-reading instruction to the vector-register controller, according to the to-be-read-vector address space in the vector-reading instruction, the to-be-read length and the to-be-read width, determining the to-be-read-vector-register-file bit address.

In some specific implementations, the vector-register controller 11 is configured for:

regarding a product of the to-be-read length and the to-be-read width as a data-bit-address length of the to-be-read vector in the vector-register file; and from a first register in the vector-register controller, determining a to-be-read head address of the to-be-read-vector address space in the vector-register file, and inputting the data-bit-address length and the to-be-read head address into a reading-data address line of the vector-register file, so that the vector-register file obtains the to-be-read-vector-register-file bit address.

In some specific implementations, the vector-register file 13 is configured for:

by a local reading-data address line, obtaining the data-bit-address length, wherein a width of the reading-data address line is a data bit number that the vector-register file is capable of storing, to operate the vector-register file with a precision of a bit; and by a local reading-data address line, obtaining the to-be-read head address, and shifting the data-bit-address length by a length of the to-be-read head address, to obtain the to-be-read-vector-register-file bit address, wherein the reading-data address line is controlled by a shift controller.

In some specific implementations, the vector-register controller 11 is configured for:

when the vector-length-width register does not send the to-be-read length and the to-be-read width that correspond to the vector-reading instruction to the vector-register controller, from a first register in the vector-register controller, determining a to-be-read head address of the to-be-read-vector address space in the vector-register file;

determining a vector length in a second register in the vector-register controller that corresponds to the to-be-read-vector address space as the to-be-read length, and determining a vector width in a third register in the vector-register controller that corresponds to the to-be-read-vector address space as the to-be-read width;

regarding a product of the to-be-read length and the to-be-read width as a data-bit-address length of the to-be-read vector in the vector-register file; and inputting the data-bit-address length and the to-be-read head address into a reading-data address line of the vector-register file, whereby the vector-register file obtains the to-be-read-vector-register-file bit address.

In some specific implementations, the nonstandard-vector converting unit 12 is configured for:

by the nonstandard-vector converting unit, obtaining the to-be-read vector, and when a received second converting instruction sent by the vector-register controller indicates that the to-be-read vector is a nonstandard vector, converting the to-be-read vector into a standard vector of second preset length and width, and sending a to-be-read standard vector that is obtained by the conversion to the vector processing unit, wherein the second preset length and width refer to a length and a width of a predetermined inputted vector of the vector processing unit, and the standard vector refers to a vector whose length is a power of 2.

In some specific implementations, the nonstandard-vector converting unit 12 is configured for:

receiving the second converting instruction sent by the vector-register controller, wherein the second converting instruction contains a first actual length and a first actual width of the to-be-read vector; and when the first actual length is not a power of 2, which indicates that the to-be-read vector is a nonstandard vector, reading the second preset length and width from the nonstandard-vector converting unit, supplementing a vector length of the to-be-read vector from the first actual length to a preset length of the second preset length and width, and supplementing a vector width of each of elements of the to-be-read vector from the first actual width to a preset width of the second preset length and width, to convert the to-be-read vector into a standard vector of the second preset length and width.

Optionally, an embodiment of the present disclosure further discloses an electronic device, wherein the electronic device includes the vector-register system stated above, to implement the method for vector reading-writing according to the above embodiments.

The specific process of the method for vector reading-writing may refer to the corresponding contents disclosed in the above embodiments, and is not discussed further herein.

Figure 7:
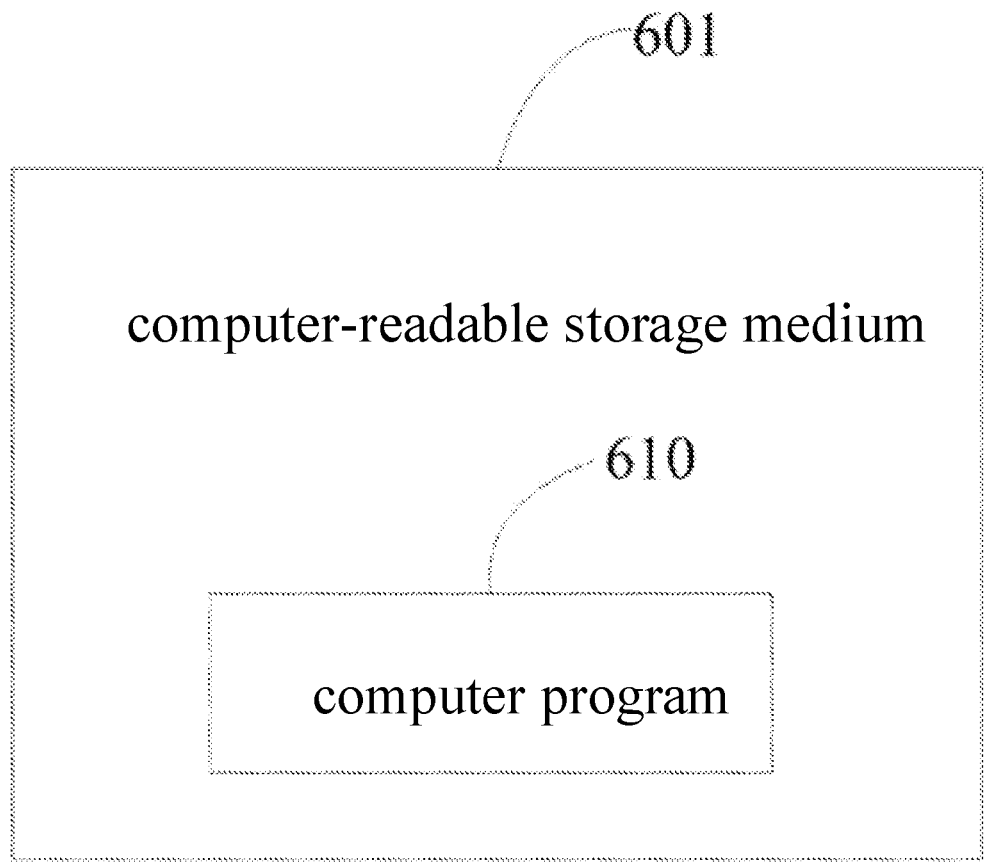
FIG. 7 is a schematic structural diagram of a computer-readable storage medium according to the present disclosure.

Referring to FIG. 7, optionally, an embodiment of the present disclosure further discloses a computer-readable storage medium 601 configured for saving a computer program 610, and the computer program 610, when executed by a processor, implements the method for vector reading-writing according to any one of the above embodiments.

The specific process of the method for vector reading-writing may refer to the corresponding contents disclosed in the above embodiments, and is not discussed further herein.

The embodiments of the description are described in the mode of progression, each of the embodiments emphatically describes the differences from the other embodiments, and the same or similar parts of the embodiments may refer to each other. Regarding the devices according to the embodiments, because they correspond to the methods according to the embodiments, they are described simply, and the relevant parts may refer to the description on the methods.

The steps of the method or algorithm described with reference to the embodiments disclosed herein may be implemented directly by using hardware, a software module executed by a processor or a combination thereof. The software module may be embedded in a random access memory (RAM), an internal memory, a read-only memory (ROM), an electrically programmable ROM, an electrically erasable programmable ROM, a register, a hard disk, a removable disk, a CD-ROM, or a storage medium in any other forms well known in the art.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

The method for vector reading-writing, the vector-register system, the device and the medium according to the present disclosure have been described in detail above. The principle and the embodiments of the present disclosure are described herein with reference to the specific examples, and the description of the above embodiments is merely intended to facilitate to comprehend the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. A method for vector reading-writing, applied to a predetermined vector-register system, comprising:

by a vector-register controller, obtaining a vector-operation instruction sent by a processor, wherein the vector-operation instruction comprises a vector-writing instruction and/or a vector-reading instruction;

when the vector-operation instruction is the vector-writing instruction, by the vector-register controller, converting a to-be-written-vector address space in the vector-writing instruction into a to-be-written-vector-register-file bit address;

by a nonstandard-vector converting unit, obtaining a to-be-written standard vector of first preset length and width sent by a vector processing unit, and when a received first converting instruction sent by the vector-register controller indicates that a valid vector in the to-be-written vector is a nonstandard vector, converting the to-be-written standard vector into a to-be-written nonstandard vector; and by a vector-register file, obtaining the to-be-written-vector-register-file bit address, and storing the to-be-written nonstandard vector into the to-be-written-vector-register-file bit address; and when the vector-operation instruction is the vector-reading instruction, according to a to-be-read width and a to-be-read length that correspond to the vector-reading instruction, by the vector-register controller, converting a to-be-read-vector address space in the vector-reading instruction into a to-be-read-vector-register-file bit address, wherein the to-be-read width is a standard width or a nonstandard width, and the to-be-read length is a standard length or a nonstandard length; and by the vector-register file, obtaining the to-be-read-vector-register-file bit address, and outputting a to-be-read vector corresponding to the to-be-read-vector-register-file bit address.

2. The method for vector reading-writing according to claim 1, wherein according to the to-be-read width and the to-be-read length that correspond to the vector-reading instruction, by the vector-register controller, converting the to-be-read-vector address space in the vector-reading instruction into the to-be-read-vector-register-file bit address comprises:

determining whether a vector-length-width register sends the to-be-read length and the to-be-read width that correspond to the vector-reading instruction to the vector-register controller; and when the vector-length-width register sends the to-be-read length and the to-be-read width that correspond to the vector-reading instruction to the vector-register controller, according to the to-be-read-vector address space in the vector-reading instruction, the to-be-read length and the to-be-read width, determining the to-be-read-vector-register-file bit address.

3. The method for vector reading-writing according to claim 2, wherein according to the to-be-read-vector address space in the vector-reading instruction, the to-be-read length and the to-be-read width, determining the to-be-read-vector-register-file bit address comprises:

regarding a product of the to-be-read length and the to-be-read width as a data-bit-address length of the to-be-read vector in the vector-register file; and from a first register in the vector-register controller, determining a to-be-read head address of the to-be-read-vector address space in the vector-register file, and inputting the data-bit-address length and the to-be-read head address into a reading-data address line of the vector-register file, so that the vector-register file obtains the to-be-read-vector-register-file bit address.

4. The method for vector reading-writing according to claim 3, wherein by the vector-register file, obtaining the to-be-read-vector-register-file bit address comprises:

by the reading-data address line of the vector-register file, obtaining the data-bit-address length, wherein a width of the reading-data address line is a data bit number that the vector-register file is capable of storing, to operate the vector-register file with a precision of a bit; and by the reading-data address line of the vector-register file, obtaining the to-be-read head address, and shifting the data-bit-address length by a length of the to-be-read head address, to obtain the to-be-read-vector-register-file bit address, wherein the reading-data address line is controlled by a shift controller.

5. The method for vector reading-writing according to claim 2, wherein after determining whether the vector-length-width register sends the to-be-read length and the to-be-read width that correspond to the vector-reading instruction to the vector-register controller, the method further comprises:

when the vector-length-width register does not send the to-be-read length and the to-be-read width that correspond to the vector-reading instruction to the vector-register controller, from a first register in the vector-register controller, determining a to-be-read head address of the to-be-read-vector address space in the vector-register file;

determining a vector length in a second register in the vector-register controller that corresponds to the to-be-read-vector address space as the to-be-read length, and determining a vector width in a third register in the vector-register controller that corresponds to the to-be-read-vector address space as the to-be-read width;

regarding a product of the to-be-read length and the to-be-read width as a data-bit-address length of the to-be-read vector in the vector-register file; and inputting the data-bit-address length and the to-be-read head address into a reading-data address line of the vector-register file, so that the vector-register file obtains the to-be-read-vector-register-file bit address.

6. The method for vector reading-writing according to claim 1, wherein after outputting the to-be-read vector corresponding to the to-be-read-vector-register-file bit address, the method further comprises:
by the nonstandard-vector converting unit, obtaining the to-be-read vector, and when a received second converting instruction sent by the vector-register controller indicates that the to-be-read vector is a nonstandard vector, converting the to-be-read vector into a standard vector of second preset length and width, and sending a to-be-read standard vector that is obtained by the conversion to the vector processing unit, wherein the second preset length and width refer to a length and a width of a predetermined inputted vector of the vector processing unit, and the standard vector refers to a vector whose length is a power of 2.

7. The method for vector reading-writing according to claim 6, wherein when the received second converting instruction sent by the vector-register controller indicates that the to-be-read vector is the nonstandard vector, converting the to-be-read vector into the standard vector of second preset length and width comprises:
receiving the second converting instruction sent by the vector-register controller, wherein the second converting instruction contains a first actual length and a first actual width of the to-be-read vector; and
when the first actual length is not a power of 2, which indicates that the to-be-read vector is the nonstandard vector, reading the second preset length and width from the nonstandard-vector converting unit, supplementing a vector length of the to-be-read vector from the first actual length to a preset length of the second preset length and width, and supplementing a vector width of each of elements of the to-be-read vector from the first actual width to a preset width of the second preset length and width, to convert the to-be-read vector into a standard vector of the second preset length and width.

8. The method for vector reading-writing according to claim 1,
wherein vector elements in the vector-register file are continuously stored, and there is not a null bit between any two neighboring vector elements in a vector in the vector-register file.

9. A vector-register system, comprising:
a vector-register controller configured for obtaining a vector-operation instruction sent by a processor, wherein the vector-operation instruction comprises a vector-writing instruction and/or a vector-reading instruction;
wherein the vector-register controller is further configured for, when the vector-operation instruction is the vector-writing instruction, converting a to-be-written-vector address space in the vector-writing instruction into a to-be-written-vector-register-file bit address;
a nonstandard-vector converting unit configured for obtaining a to-be-written standard vector of first preset length and width sent by a vector processing unit, and when a received first converting instruction sent by the vector-register controller indicates that a valid vector in the to-be-written vector is a nonstandard vector, converting the to-be-written standard vector into a to-be-written nonstandard vector; and
a vector-register file configured for obtaining the to-be-written-vector-register-file bit address, and storing the to-be-written nonstandard vector into the to-be-written-vector-register-file bit address;
wherein the vector-register controller is further configured for, when the vector-operation instruction is the vector-reading instruction, according to a to-be-read width and a to-be-read length that correspond to the vector-reading instruction, converting a to-be-read-vector address space in the vector-reading instruction into a to-be-read-vector-register-file bit address, wherein the to-be-read width is a standard width or a nonstandard width, and the to-be-read length is a standard length or a nonstandard length; and
wherein the vector-register file is further configured for, by the vector-register file, obtaining the to-be-read-vector-register-file bit address, and outputting a to-be-read vector corresponding to the to-be-read-vector-register-file bit address.

10. An electronic device, wherein the electronic device comprises the vector-register system according to claim 9.

11. A non-transitory computer-readable storage medium, wherein the computer-readable storage medium is configured to save a computer program, and the computer program, when executed by a processor, implements the method for vector reading-writing according to claim 1.

12. The method for vector reading-writing according to claim 1, wherein the first preset length and width are a length and a width of fixed standards.

13. The method for vector reading-writing according to claim 1, wherein the first converting instruction contains a writing length and a writing width, and the writing length and the writing width are actual effective length and width in the to-be-written standard vector.

14. The method for vector reading-writing according to claim 1, wherein the vector-register controller comprises a first controller, and the first controller is configured for storing the head address in a vector register of each vector.

15. The method for vector reading-writing according to claim 1, wherein after, by the vector-register controller, converting the to-be-read-vector address space in the vector-reading instruction into the to-be-read-vector-register-file bit address, the method further comprises:
sending the to-be-read-vector-register-file bit address to the vector-register file by the vector-register controller, wherein the vector-register file is configured for registering vectors.

16. The method for vector reading-writing according to claim 5, wherein the second register records a length of each vector in the vector-register file, and the third register records a width of each vector in the vector-register file.

17. The non-transitory computer-readable storage medium according to claim 11, wherein according to the to-be-read width and the to-be-read length that correspond to the vector-reading instruction, by the vector-register controller, converting the to-be-read-vector address space in the vector-reading instruction into the to-be-read-vector-register-file bit address comprises:
determining whether a vector-length-width register sends the to-be-read length and the to-be-read width that correspond to the vector-reading instruction to the vector-register controller; and
when the vector-length-width register sends the to-be-read length and the to-be-read width that correspond to the vector-reading instruction to the vector-register controller, according to the to-be-read-vector address space in the vector-reading instruction, the to-be-read length and the to-be-read width, determining the to-be-read-vector-register-file bit address.

18. The non-transitory computer-readable storage medium according to claim 17, wherein according to the to-be-read-vector address space in the vector-reading instruction, the to-be-read length and the to-be-read width, determining the to-be-read-vector-register-file bit address comprises:
    regarding a product of the to-be-read length and the to-be-read width as a data-bit-address length of the to-be-read vector in the vector-register file; and
    from a first register in the vector-register controller, determining a to-be-read head address of the to-be-read-vector address space in the vector-register file, and inputting the data-bit-address length and the to-be-read head address into a reading-data address line of the vector-register file, so that the vector-register file obtains the to-be-read-vector-register-file bit address.

19. The non-transitory computer-readable storage medium according to claim 18, wherein by the vector-register file, obtaining the to-be-read-vector-register-file bit address comprises:
    by the reading-data address line of the vector-register file, obtaining the data-bit-address length, wherein a width of the reading-data address line is a data bit number that the vector-register file is capable of storing, to operate the vector-register file with a precision of a bit; and
    by the reading-data address line of the vector-register file, obtaining the to-be-read head address, and shifting the data-bit-address length by a length of the to-be-read head address, to obtain the to-be-read-vector-register-file bit address, wherein the reading-data address line is controlled by a shift controller.

20. The non-transitory computer-readable storage medium according to claim 17, wherein after determining whether the vector-length-width register sends the to-be-read length and the to-be-read width that correspond to the vector-reading instruction to the vector-register controller, the method further comprises:
    when the vector-length-width register does not send the to-be-read length and the to-be-read width that correspond to the vector-reading instruction to the vector-register controller, from a first register in the vector-register controller, determining a to-be-read head address of the to-be-read-vector address space in the vector-register file;
    determining a vector length in a second register in the vector-register controller that corresponds to the to-be-read-vector address space as the to-be-read length, and determining a vector width in a third register in the vector-register controller that corresponds to the to-be-read-vector address space as the to-be-read width;
    regarding a product of the to-be-read length and the to-be-read width as a data-bit-address length of the to-be-read vector in the vector-register file; and
    inputting the data-bit-address length and the to-be-read head address into a reading-data address line of the vector-register file, so that the vector-register file obtains the to-be-read-vector-register-file bit address.

\* \* \* \* \*